US012106882B2

(12) United States Patent
Kuo et al.

(10) Patent No.: US 12,106,882 B2
(45) Date of Patent: Oct. 1, 2024

(54) MAGNETIC ELEMENT

(71) Applicant: Delta Electronics, Inc., Taoyuan (TW)

(72) Inventors: Tsung-Nan Kuo, Taoyuan (TW); Lei-Chung Hsing, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 745 days.

(21) Appl. No.: 17/332,121

(22) Filed: May 27, 2021

(65) Prior Publication Data

US 2022/0130586 A1 Apr. 28, 2022

(30) Foreign Application Priority Data

Oct. 23, 2020 (CN) ......................... 202011142244.5

(51) Int. Cl.

| | |
|---|---|
| ***H01F 27/24*** | (2006.01) |
| ***H01F 3/14*** | (2006.01) |
| ***H01F 27/26*** | (2006.01) |
| ***H01F 27/28*** | (2006.01) |
| ***H01F 27/30*** | (2006.01) |

(52) U.S. Cl.

CPC ........... *H01F 27/24* (2013.01); *H01F 27/263* (2013.01); *H01F 27/28* (2013.01); *H01F 27/306* (2013.01); *H01F 3/14* (2013.01)

(58) Field of Classification Search

CPC ...... H01F 27/263; H01F 27/28; H01F 27/306; H01F 27/24; H01F 17/04; H01F 27/38; H01F 37/00; H01F 27/34

USPC .................................................. 336/200, 131

See application file for complete search history.

(56) References Cited

U.S. PATENT DOCUMENTS 4,613,841 A 9/1986 Roberts
5,177,460 A * 1/1993 Dhyanchand ........... H02M 7/49 336/215
5,481,238 A * 1/1996 Carsten ..................... G05F 1/24 336/215
6,867,564 B1 3/2005 Wu et al.
7,332,992 B2 * 2/2008 Iwai ...................... H01F 27/255 336/170
7,839,251 B2 11/2010 Sodo
(Continued)

FOREIGN PATENT DOCUMENTS

CN 1036957 C 1/1998
CN 101640123 A 2/2010
(Continued)

*Primary Examiner* — Shawki S Ismail
*Assistant Examiner* — Joselito S. Baisa
(74) *Attorney, Agent, or Firm* — KIRTON McCONKIE; Evan R. Witt

(57) ABSTRACT

A magnetic element includes a first magnetic core, a second magnetic core, a first winding and a second winding. The first magnetic core includes a first lateral core part, a second lateral core part and a first middle core part between the first lateral core part and the second lateral core part. The second magnetic core includes a third lateral core part, a fourth lateral core part and a second middle core part between the third lateral core part and the fourth lateral core part. The third lateral core part is located beside the first middle core part. The second middle core part is located beside the second lateral core part. The first winding is wound around the first middle core part and the third lateral core part. The second winding is wound around the second middle core part and the second lateral core part.

3 Claims, 17 Drawing Sheets

(56) References Cited

U.S. PATENT DOCUMENTS

| | | | | |
|---|---|---|---|---|
| 8,115,582 | B2 * | 2/2012 | Chen | H01F 37/00 336/84 R |
| 8,125,304 | B2 | 2/2012 | Brubaker et al. | |
| 8,514,593 | B2 * | 8/2013 | Brinlee | H01F 3/14 363/21.12 |
| 9,093,212 | B1 * | 7/2015 | Pinkerton | H01F 27/24 |
| 11,217,379 | B2 * | 1/2022 | Mondal | H02M 1/0043 |
| 2003/0043006 | A1 | 3/2003 | Sun et al. | |
| 2012/0106210 | A1 | 5/2012 | Xu et al. | |

FOREIGN PATENT DOCUMENTS

| | | | | |
|---|---|---|---|---|
| CN | 102074330 | A | | 5/2011 |
| CN | 103427679 | A | | 12/2013 |
| DE | 10152867 | A1 | | 5/2003 |
| DE | 202008013649 | U1 | | 2/2010 |
| DE | 102013209573 | A1 | | 11/2013 |
| EP | 2068430 | A2 | | 6/2009 |
| GB | 1542445 | A | | 3/1979 |
| JP | 2006222387 | A | * | 8/2006 |
| JP | 2007311388 | A | * | 11/2007 |
| TW | I479516 | B | | 4/2015 |
| TW | M582692 | U | | 8/2019 |

* cited by examiner

MAGNETIC ELEMENT

CROSS-REFERENCE TO RELATED APPLICATION

This application claims priority to China Patent Application No. 202011142244.5 filed on Oct. 23, 2020. The entirety of the above-mentioned patent application is incorporated herein by reference for all purposes.

FIELD OF THE INVENTION

The present disclosure relates to a magnetic element, and more particularly to a magnetic element with two magnetic cores and having enhanced efficacy of suppressing electromagnetic interference.

BACKGROUND OF THE INVENTION

Nowadays, a variable-frequency drive is configured to convert the input electric power into a regulated power for supplying power to a motor. The variable-frequency drive includes a rectifier, a DC reactor and an insulated gate bipolar transistor (IGBT). The rectifier is configured to convert the input electric power into a DC power. The DC reactor is configured to reduce the harmonic disturbance of the DC power and output the DC power to the insulated gate bipolar transistor. The insulated gate bipolar transistor is configured to convert the DC power into an AC power for supplying power to the motor.

Conventionally, the magnetic element of the variable-frequency drive includes a single magnetic core. As known, the magnetic element with the single magnetic core is unable to effectively suppress the electromagnetic interference (EMI). For suppressing the electromagnetic interference and allowing the variable-frequency drive to be operated in a differential mode or a common mode, the variable-frequency drive with two individual magnetic elements has been introduced into the market. Each of the two magnetic elements includes a single magnetic core. The two magnetic elements are separately located at two ends of the variable-frequency drive. That is, one of the magnetic elements is located at a positive voltage terminal behind the commutator of the variable-frequency drive, and the other magnetic element is located at a negative voltage terminal behind the commutator of the variable-frequency drive. However, this architecture requires two reactors, and the common mode inductance cannot be effectively enhanced.

Therefore, there is a need of providing an improved magnetic element in order to address the drawbacks of the conventional technology.

SUMMARY OF THE INVENTION

An object of the present disclosure provides a magnetic element capable of being operated in two modes and having enhanced efficacy of suppressing electromagnetic interference.

In accordance with an aspect of the present disclosure, a magnetic element is provided. The magnetic element includes a first magnetic core, a second magnetic core, a first winding and a second winding. The first magnetic core includes a first middle core part, a first lateral core part and a second lateral core part. The first middle core part is disposed between the first lateral core part and the second lateral core part. The second magnetic core is partially aligned to the first magnetic core and includes a second middle core part, a third lateral core part and a fourth lateral core part. The second middle core part is disposed between the third lateral core part and the fourth lateral core part. The third lateral core part is located beside the first middle core part. The second middle core part is located beside the second lateral core part. The first winding is wound around the first middle core part and the third lateral core part. The second winding is wound around the second middle core part and the second lateral core part.

In accordance with another aspect of the present disclosure, a magnetic element is provided. The magnetic element includes a first magnetic core, a second magnetic core, a first winding and a second winding. The first magnetic core includes a first middle core part, a first lateral core part and a second lateral core part. The first middle core part is disposed between the first lateral core part and the second lateral core part. The second magnetic core is in symmetry with the first magnetic core and includes a second middle core part, a third lateral core part and a fourth lateral core part. The second middle core part is disposed between the third lateral core part and the fourth lateral core part. The second middle core part is located beside the first middle core part. The third lateral core part is located beside the first lateral core part. The fourth lateral core part is located beside the second lateral core part. The first winding is wound around the first middle core part and the second middle core part. The second winding is wound around the second lateral core part and the fourth lateral core part.

In accordance with a further aspect of the present disclosure, a magnetic element is provided. The magnetic element includes a first magnetic core, a second magnetic core, a first winding and a second winding. The first magnetic core includes a first upper core part, a first lower core part, a first middle core part, a first lateral core part and a second lateral core part. The first upper core part and the first lower core part are opposed to each other. The first middle core part, the first lateral core part and the second lateral core part are disposed between the first upper core part and the first lower core part. The first winding is wound around the first middle core part. The second magnetic core is coplanar with the first magnetic core and includes a second upper core part, a second lower core part, a second middle core part, a third lateral core part and a fourth lateral core part. The second upper core part and the second lower core part are opposed to each other. The second middle core part, the third lateral core part and the fourth lateral core part are disposed between the second upper core part and the second lower core part. The first lower core part and the second lower core part are attached on each other to form a combined lower core part. The second lateral core part and the third lateral core part are attached on each other to form a combined lateral core part. The second winding is wound around the second middle core part. A first air gap is formed between the first lateral core part and the combined lower core part. A second air gap is formed between the first middle core part and the combined lower core part. A third air gap is formed between the combined lateral core part and the combined lower core part. A fourth air gap is formed between the second middle core part and the combined lower core part. A fifth air gap is formed between the fourth lateral core part and the combined lower core part. The second air gap is smaller than the first air gap and the third air gap. The fourth air gap is smaller than the third air gap and the fifth air gap.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
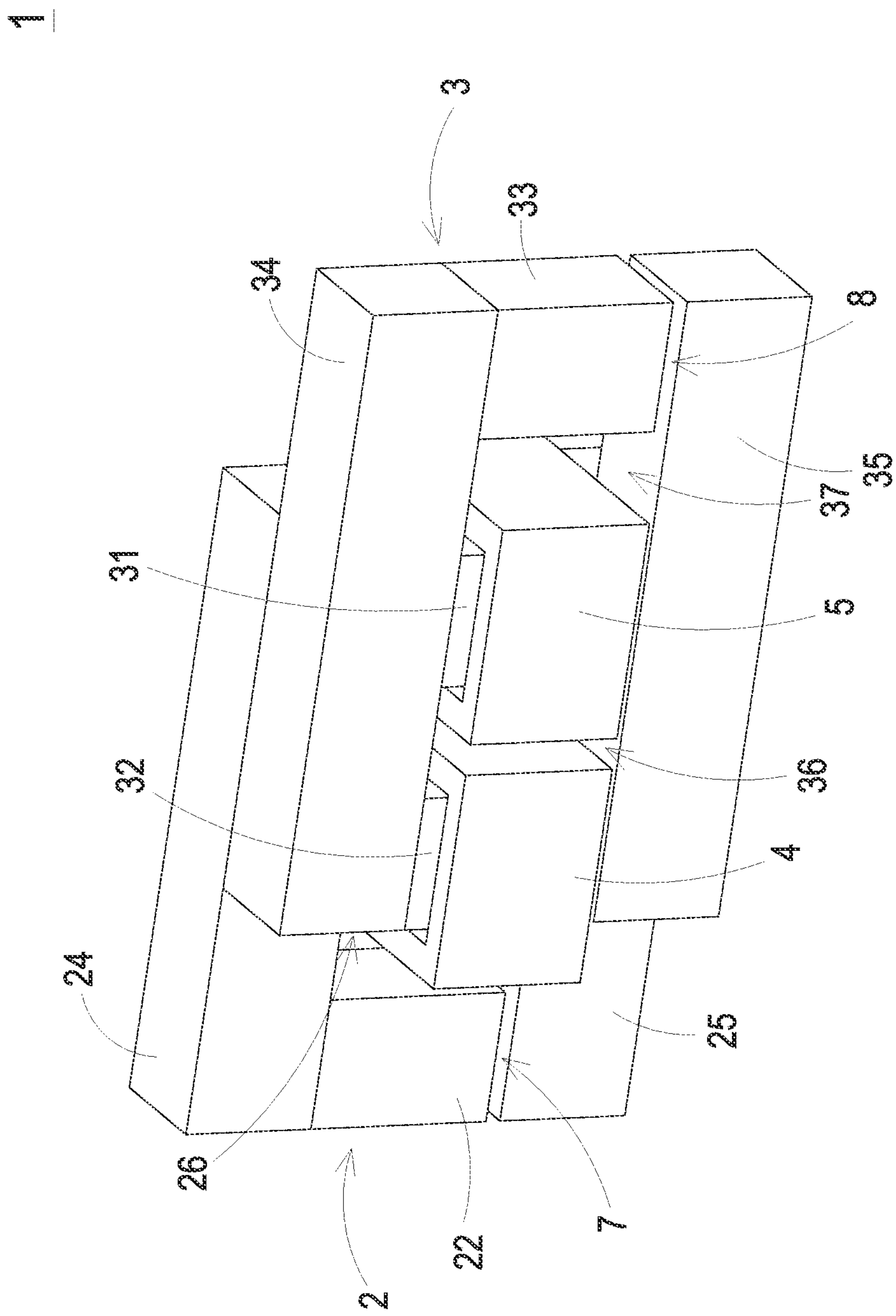
FIG. 1 is a schematic perspective view illustrating the structure of a magnetic element according to a first embodiment of the present disclosure.
Figure 2:
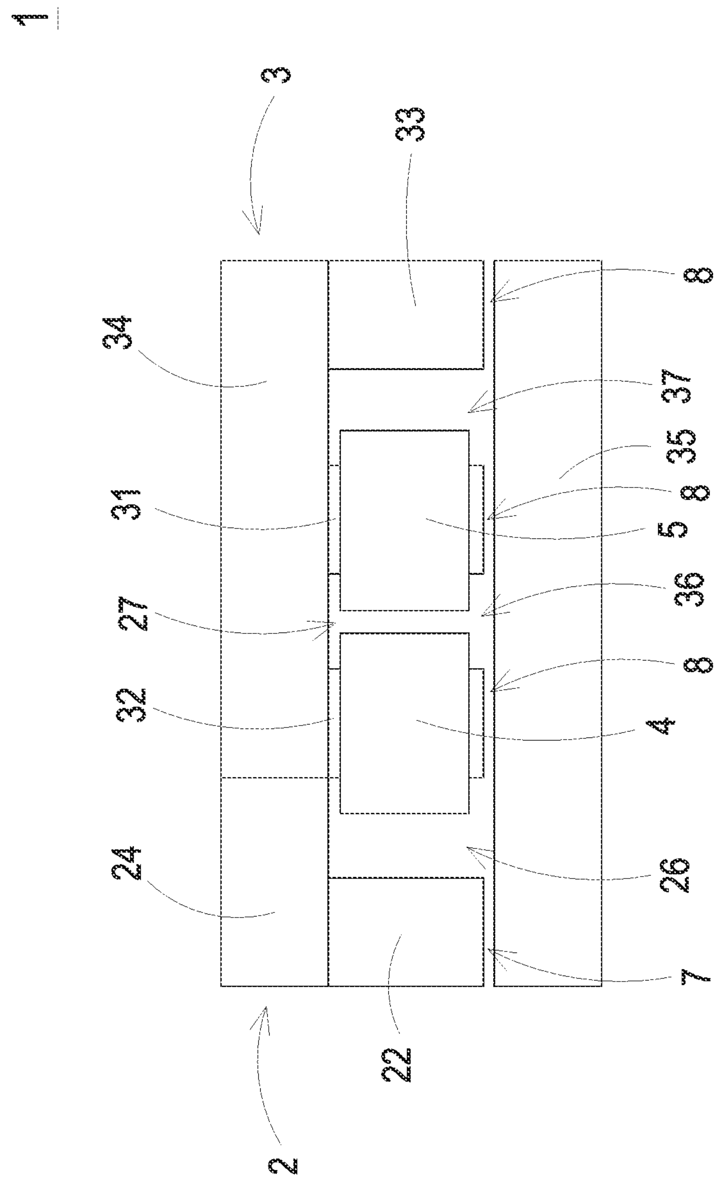
FIG. 2 is a schematic side view illustrating the structure of the magnetic element as shown in FIG. 1 and taken along another viewpoint.
Figure 3:
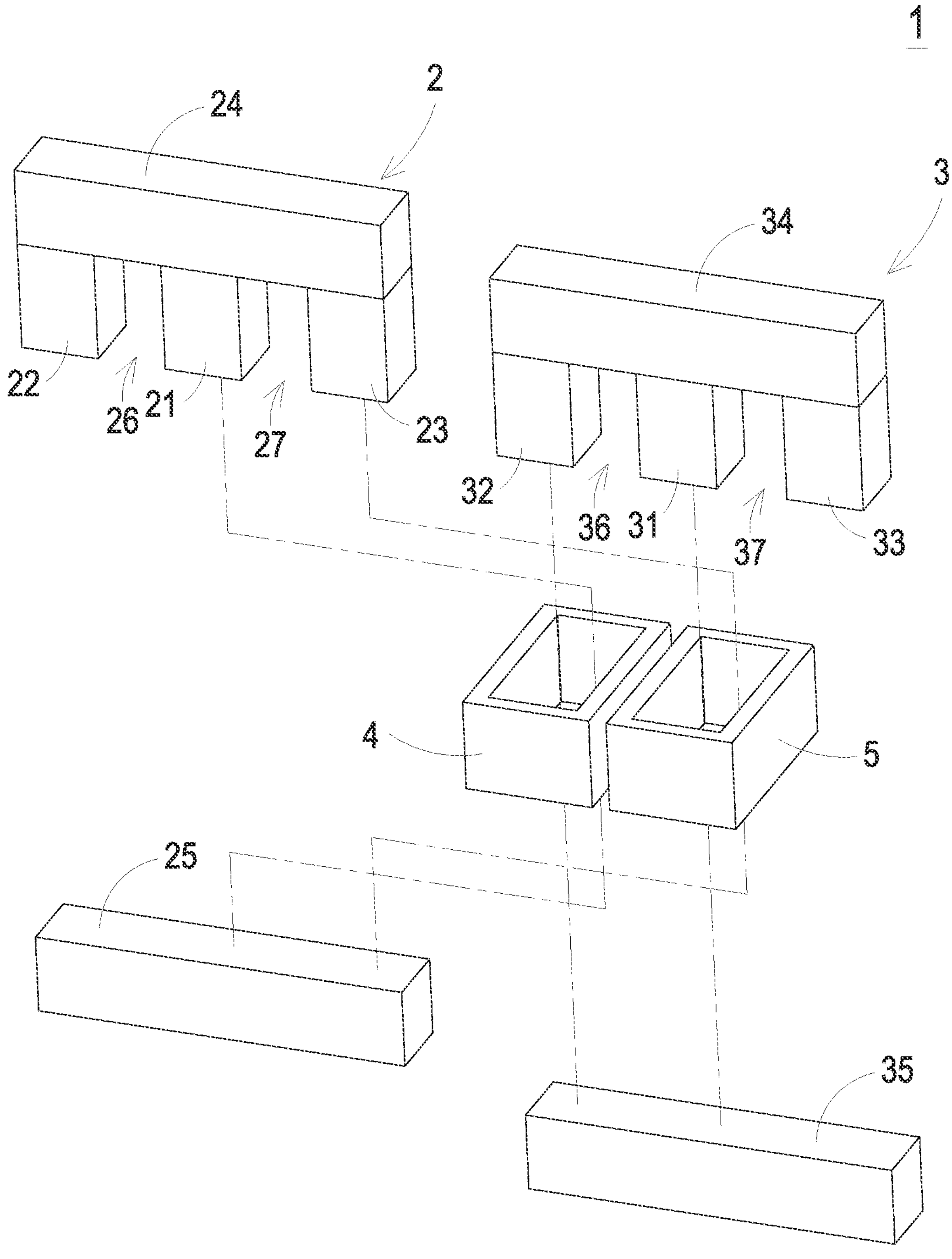
FIG. 3 is a schematic exploded view illustrating the structure of the magnetic element as shown in FIG. 1.
Figure 4:
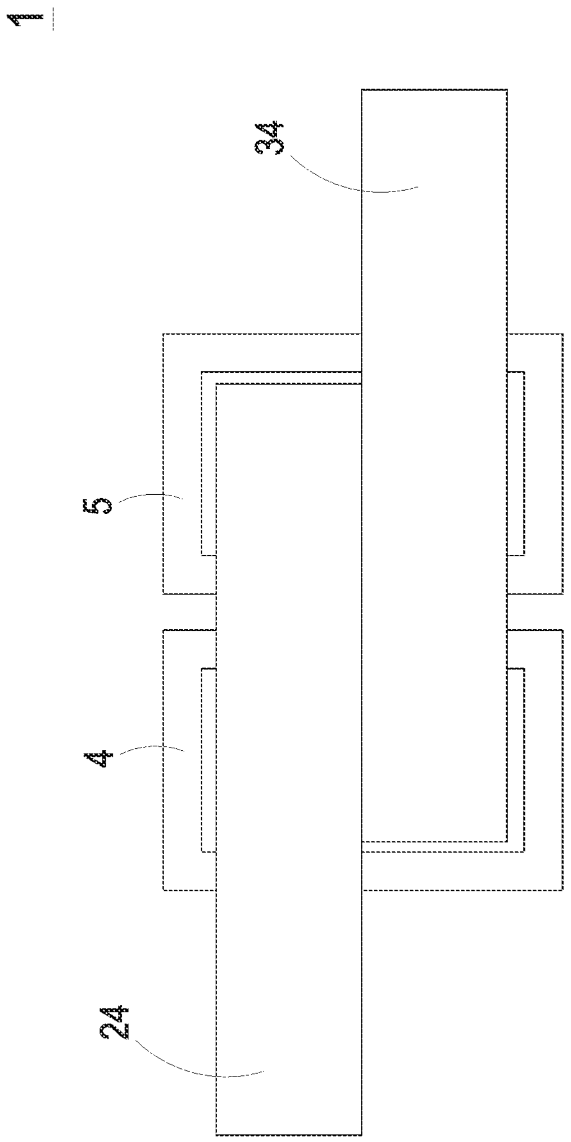
FIG. 4 is a schematic top view illustrating the structure of the magnetic element as shown in FIG. 1.

Please refer to FIGS. 1, 2, 3 and 4. FIG. 1 is a schematic perspective view illustrating the structure of a magnetic element according to a first embodiment of the present disclosure. FIG. 2 is a schematic side view illustrating the structure of the magnetic element as shown in FIG. 1 and taken along another viewpoint. FIG. 3 is a schematic exploded view illustrating the structure of the magnetic element as shown in FIG. 1. FIG. 4 is a schematic top view illustrating the structure of the magnetic element as shown in FIG. 1. The magnetic element 1 is applied to a variable-frequency drive. In this embodiment, the magnetic element 1 includes a first magnetic core 2, a second magnetic core 3, a first winding 4 and a second winding 5.

As shown in FIGS. 1 and 3, the first magnetic core 2 includes a first middle core part 21, a first lateral core part 22, a second lateral core part 23, a first upper core part 24 and a first lower core part 25. The first middle core part 21 is disposed between the first lateral core part 22 and the second lateral core part 23. The first upper core part 24 and the first lower core part 25 are opposed to each other. The first middle core part 21, the first lateral core part 22 and the second lateral core part 23 are disposed between the first upper core part 24 and the first lower core part 25. Moreover, a first accommodation space 26 is defined by the first middle core part 21, the first lateral core part 22, a portion of the first upper core part 24 and a portion of the first lower core part 25 collaboratively, and a second accommodation space 27 is defined by the first middle core part 21, the second lateral core part 23, the other portion of the first upper core part 24 and the other portion of the first lower core part 25 collaboratively. In an embodiment, the first magnetic core 2 has an EI-core structure, which is defined by the first middle core part 21, the first lateral core part 22, the second lateral core part 23, the first upper core part 24 and the first lower core part 25 collaboratively.

As shown in FIG. 4, the second magnetic core 3 and the first magnetic core 2 are partially aligned to each other and disposed side by side. In an embodiment, a portion of the second magnetic core 3 and a portion of the first magnetic core 2 are attached on each other. As shown in FIGS. 1 and 3, the second magnetic core 3 includes a second middle core part 31, a third lateral core part 32, a fourth lateral core part 33, a second upper core part 34 and a second lower core part 35. The second middle core part 31 is disposed between the third lateral core part 32 and the fourth lateral core part 33. The third lateral core part 32 of the second magnetic core 3 is located beside the first middle core part 21 of the first magnetic core 2. Preferably, the third lateral core part 32 of the second magnetic core 3 is attached on the first middle core part 21 of the first magnetic core 2. The second middle core part 31 of the second magnetic core 3 is located beside the second lateral core part 23 of the first magnetic core 2. Preferably, the second middle core part 31 of the second magnetic core 3 is attached on the second lateral core part 23 of the first magnetic core 2. The second upper core part 34 and the second lower core part 35 are opposed to each other. The second middle core part 31, the third lateral core part 32 and the fourth lateral core part 33 are disposed between the second upper core part 34 and the second lower core part 35. Moreover, a third accommodation space 36 is defined by the second middle core part 31, the third lateral core part 32, a portion of the second upper core part 34 and a portion of the second lower core part 35 collaboratively, and a fourth accommodation space 37 is defined by the second middle core part 31, the fourth lateral core part 33, the other portion of the second upper core part 34 and the other portion of the second lower core part 35 collaboratively. In this embodiment, the third accommodation space 36 of the second magnetic core 3 is located beside the second accommodation space 27 of the first magnetic core 2.

As shown in FIGS. 1 and 3, in an embodiment, the second magnetic core 3 has an EI-core structure, which is defined by the second middle core part 31, the third lateral core part 32, the fourth lateral core part 33, the second upper core part 34 and the second lower core part 35 collaboratively. In an embodiment, the second upper core part 34 of the second magnetic core 3 is located beside the first upper core part 24 of the first magnetic core 2. In addition, a portion of the second upper core part 34 is attached on a portion of the first upper core part 24. The second lower core part 35 of the second magnetic core 3 is located beside the first lower core part 25 of the first magnetic core 2. In addition, a portion of the second lower core part 35 is attached on a portion of the first lower core part 25. In an embodiment, a first air gap 7 is formed between the first middle core part 21, the first lateral core part 22 and the second lateral core part 23 of the first magnetic core 2 and the first lower core part 25. Similarly, a second air gap 8 is formed between the second middle core part 31, the third lateral core part 32 and the fourth lateral core part 33 of the second magnetic core 3 and the second lower core part 35.

As shown in FIGS. 1 and 2, a portion of the first winding 4 is accommodated within the first accommodation space 26 of the first magnetic core 2, and the other portion of the first winding 4 is accommodated within the second accommodation space 27 of the first magnetic core 2 and the third accommodation space 36 of the second magnetic core 3. Consequently, the first winding 4 is wound around the first middle core part 21 of the first magnetic core 2 and the third lateral core part 32 of the second magnetic core 3. In this embodiment, the first middle core part 21 of the first magnetic core 2 is located beside the third lateral core part 32 of the second magnetic core 3. Preferably, the first middle core part 21 of the first magnetic core 2 is attached on the third lateral core part 32 of the second magnetic core 3.

A portion of the second winding 5 is accommodated within the second accommodation space 27 of the first magnetic core 2 and the third accommodation space 36 of the second magnetic core 3, and the other portion of the second winding 5 is accommodated within the fourth accommodation space 37 of the second magnetic core 3. Consequently, the second winding 5 is wound around the second lateral core part 23 of the first magnetic core 2 and the second middle core part 31 of the second magnetic core 3. In this embodiment, the second lateral core part 23 of the first magnetic core 2 is located beside the second middle core part 31 of the second magnetic core 3. Preferably, the second lateral core part 23 of the first magnetic core 2 is attached on the second middle core part 31 of the second magnetic core 3.

As shown in FIG. 1, the magnetic element 1 includes two magnetic cores (i.e., the first magnetic core 2 and the second magnetic core 3) and two windings (i.e., the first winding 4 and the second winding 5). While the directions of the currents flowing through the two windings are opposite, two different modes are generated. In the practical applications, the current from the commutator of the variable-frequency drive contains many current components. At the same time, the differential mode currents with different frequencies or the common mode currents with different frequencies are generated. Consequently, the magnetic element 1 has the functions of the differential mode inductor and the common mode inductor. According to the directions of the currents flowing through the two windings, the magnetic element 1 is selectively operated in one of the two modes so as to meet the requirements of the differential mode inductor and the common mode inductor.

Figure 5:
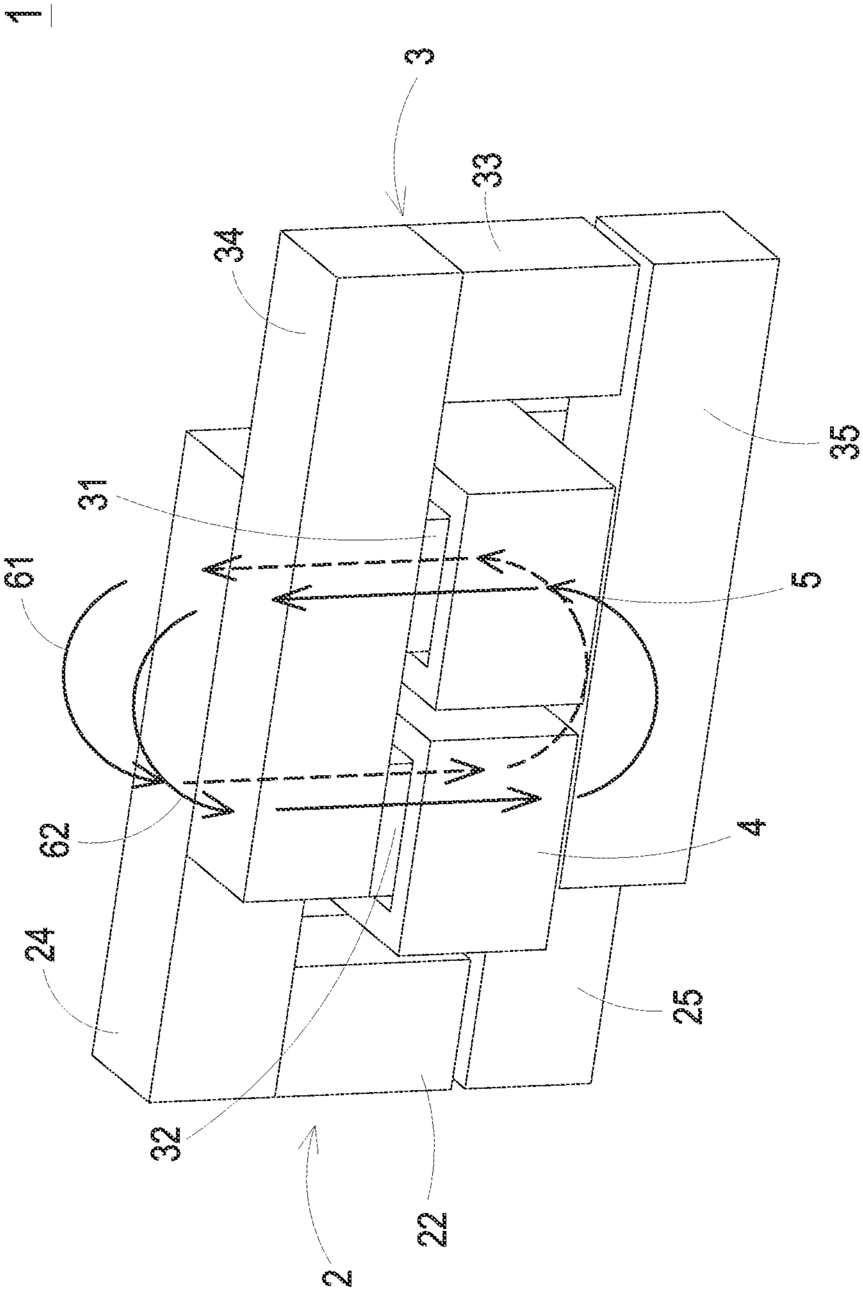
FIG. 5 schematically illustrates the operation of the magnetic element as shown in FIG. 1 and in a first mode.

FIG. 5 schematically illustrates the operation of the magnetic element as shown in FIG. 1 and in a first mode. As shown in FIG. 5, the direction of the current flowing through the first winding 4 and the direction of the current flowing through the second winding 5 are opposite. Due to the interaction between the first winding 4, the second winding 5, the first magnetic core 2 and the second magnetic core 3, the magnetic element 1 is operated in the first mode. The first magnetic force lines 61 generated by the first magnetic core 2 of the magnetic element 1 pass through the first lower core part 25, the second lateral core part 23, the first upper core part 24, the first middle core part 21 and the first lower core part 25, so that the loop of the first magnetic force lines 61 is generated. The second magnetic force lines 62 generated by the second magnetic core 3 pass through the second lower core part 35, the second middle core part 31, the second upper core part 34, the third lateral core part 32 and the second lower core part 35, so that the loop of the second magnetic force lines 62 is generated.

Please refer to FIGS. 1 and 3 again. In an embodiment, a thickness of the first air gap 7 ranges between 0.1 mm and 0.5 mm, and a thickness of the second air gap 8 ranges between 0.1 mm and 0.5 mm. In other embodiment, the thickness of the first air gap 7 formed between the first middle core part 21 and the first lower core part 25 is equal to the thickness of the first air gap 7 formed between the second lateral core part 23 and the first lower core part 25. The thickness of the second air gap 8 formed between the second middle core part 31 and the second lower core part 35 is equal to the thickness of the second air gap 8 formed between the third lateral core part 32 and the second lower core part 35. The thickness of the first air gap 7 formed between the first middle core part 21 and the first lower core part 25 is equal to the thickness of the second air gap 8 formed between the third lateral core part 32 and the second lower core part 35. The thickness of the first air gap 7 formed between the first lateral core part 22 and the first lower core part 25 is equal to the thickness of the second air gap 8 formed between the fourth lateral core part 33 and the second lower core part 35. The thickness of the first air gap 7 formed between the first lateral core part 22 and the first lower core part 25 is not equal to the thickness of the second air gap 8 formed between the third lateral core part 32 and the second lower core part 35.

Figure 6A:
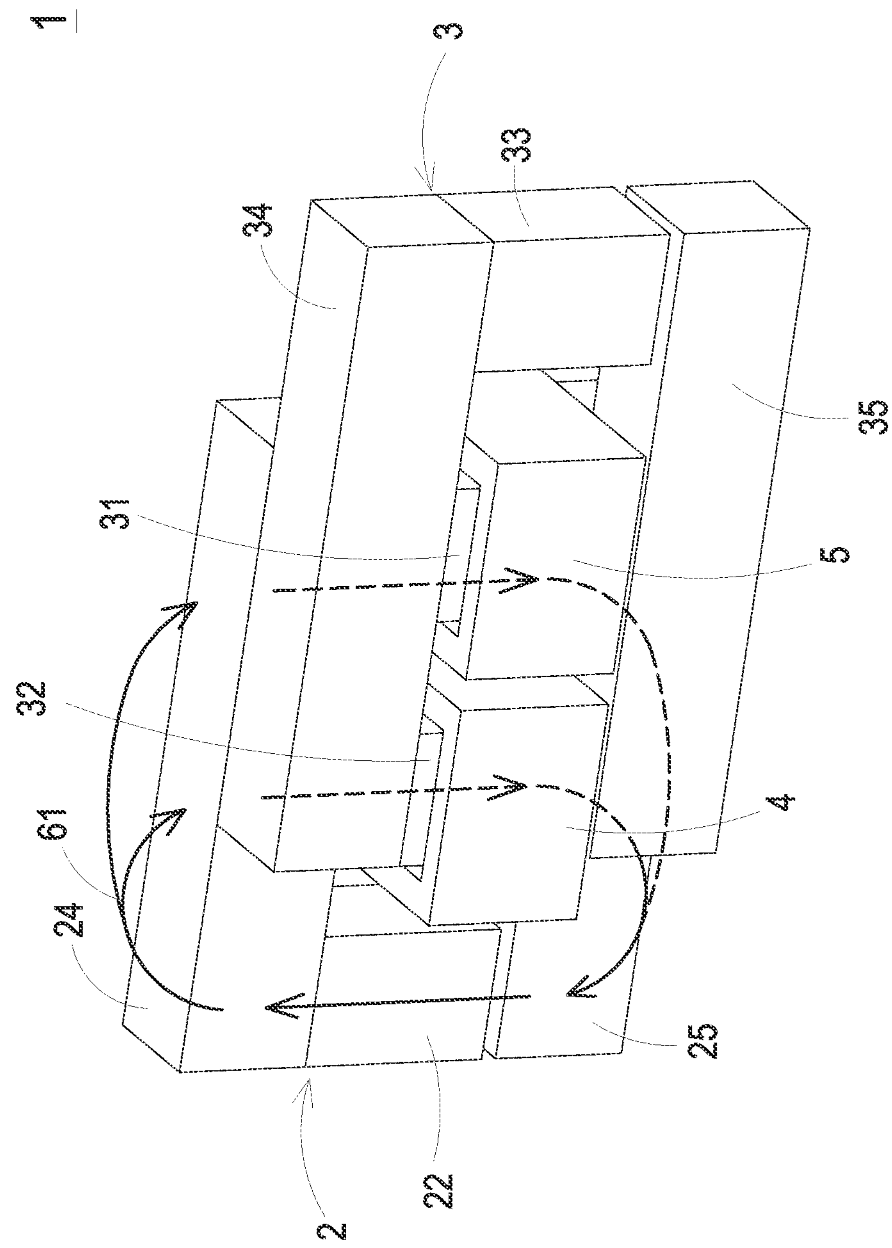
FIG. 6A schematically illustrates the operation of the first magnetic core of the magnetic element as shown in FIG. 1 and in a second mode.
Figure 6B:
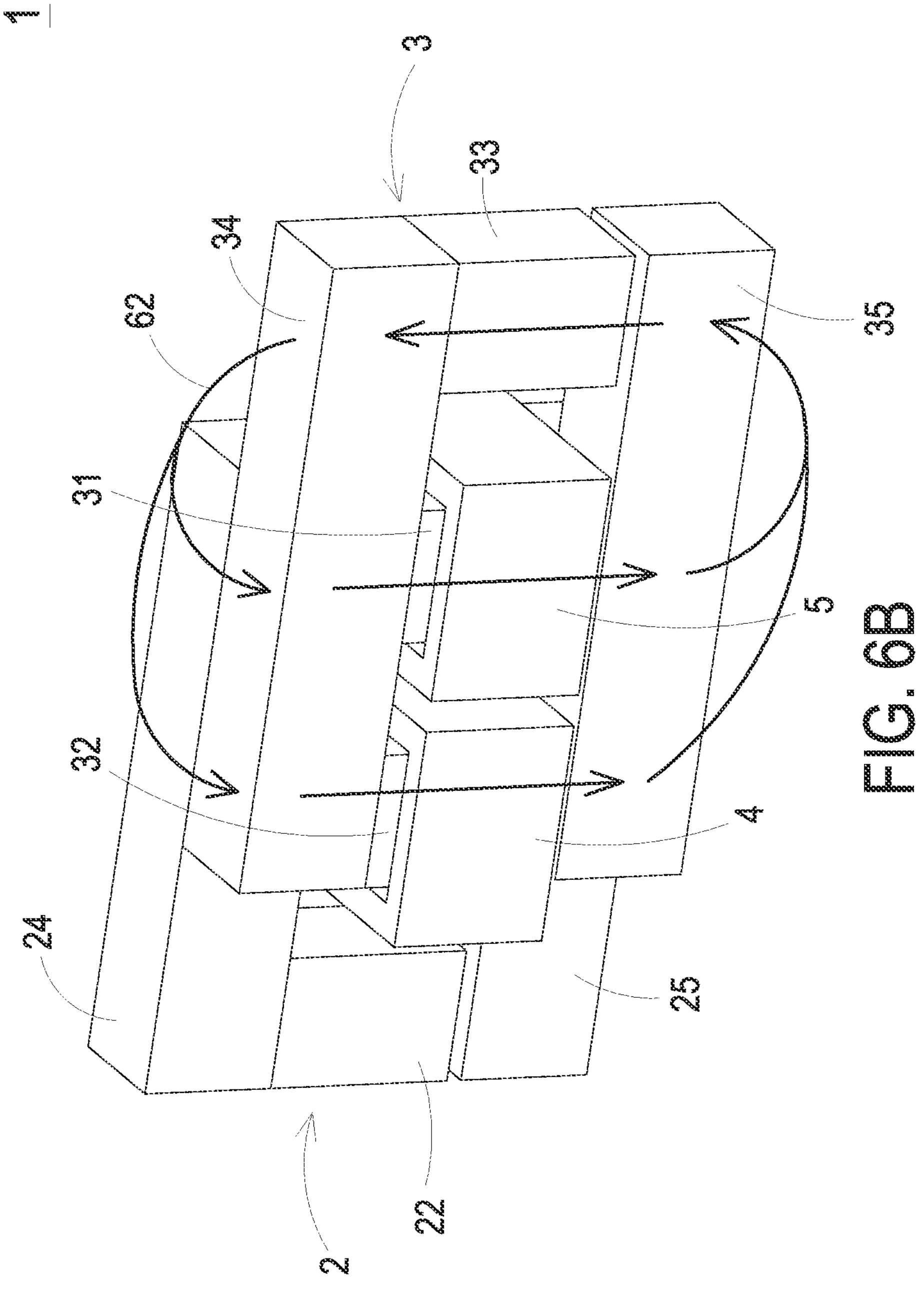
FIG. 6B schematically illustrates the operation of the second magnetic core of the magnetic element as shown in FIG. 1 and in the second mode.

FIG. 6A schematically illustrates the operation of the first magnetic core of the magnetic element as shown in FIG. 1 and in a second mode. FIG. 6B schematically illustrates the operation of the second magnetic core of the magnetic element as shown in FIG. 1 and in the second mode. As shown in FIGS. 6A and 6B, the direction of the current flowing through the first winding 4 and the direction of the current flowing through the second winding 5 are identical. Due to the interaction between the first winding 4, the second winding 5, the first magnetic core 2 and the second magnetic core 3, the magnetic element 1 is operated in the second mode. As shown in FIG. 6A, the first magnetic force lines 61 generated by the first magnetic core 2 travel along two loops. The first magnetic force lines 61 pass through the first lower core part 25, the first lateral core part 22, the first upper core part 24, the first middle core part 21 and the first lower core part 25 to form the first loop. The first magnetic force lines 61 pass through the first lower core part 25, the first lateral core part 22, the first upper core part 24, the second lateral core part 23 and the first lower core part 25 to form the second loop.

As shown in FIG. 6B, the second magnetic force lines 62 generated by the second magnetic core 3 travel along two loops. The second magnetic force lines 62 pass through the second lower core part 35, the fourth lateral core part 33, the second upper core part 34, the second middle core part 31 and the second lower core part 35 to form the first loop. The second magnetic force lines 62 pass through the second lower core part 35, the fourth lateral core part 33, the second upper core part 34, the third lateral core part 32 and the second lower core part 35 to form the second loop.

From the above descriptions, the magnetic element 1 includes the first magnetic core 2, the second magnetic core 3, the first winding 4 and the second winding 5. The first winding 4 is wound around the first magnetic core 2 and the second magnetic core 3. The second winding 5 is wound around the first magnetic core 2 and the second magnetic core 3. Due to this structural design, the magnetic element 1 can be operated in two modes. As previously described, the conventional variable-frequency drive is equipped with two magnetic elements at two ends. In contrast, the magnetic element 1 of the present disclosure is an integrated magnetic element.

Figure 7:
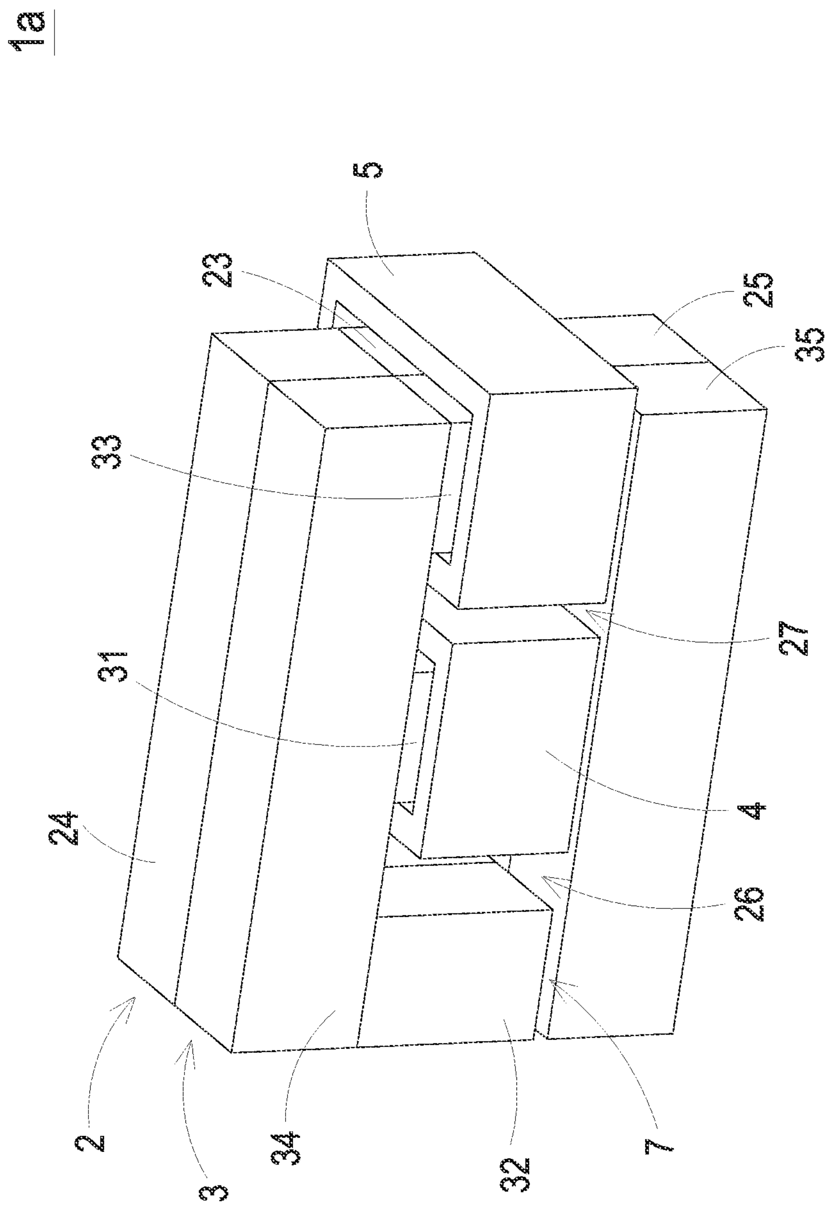
FIG. 7 is a schematic perspective view illustrating the structure of a magnetic element according to a second embodiment of the present disclosure.
Figure 8:
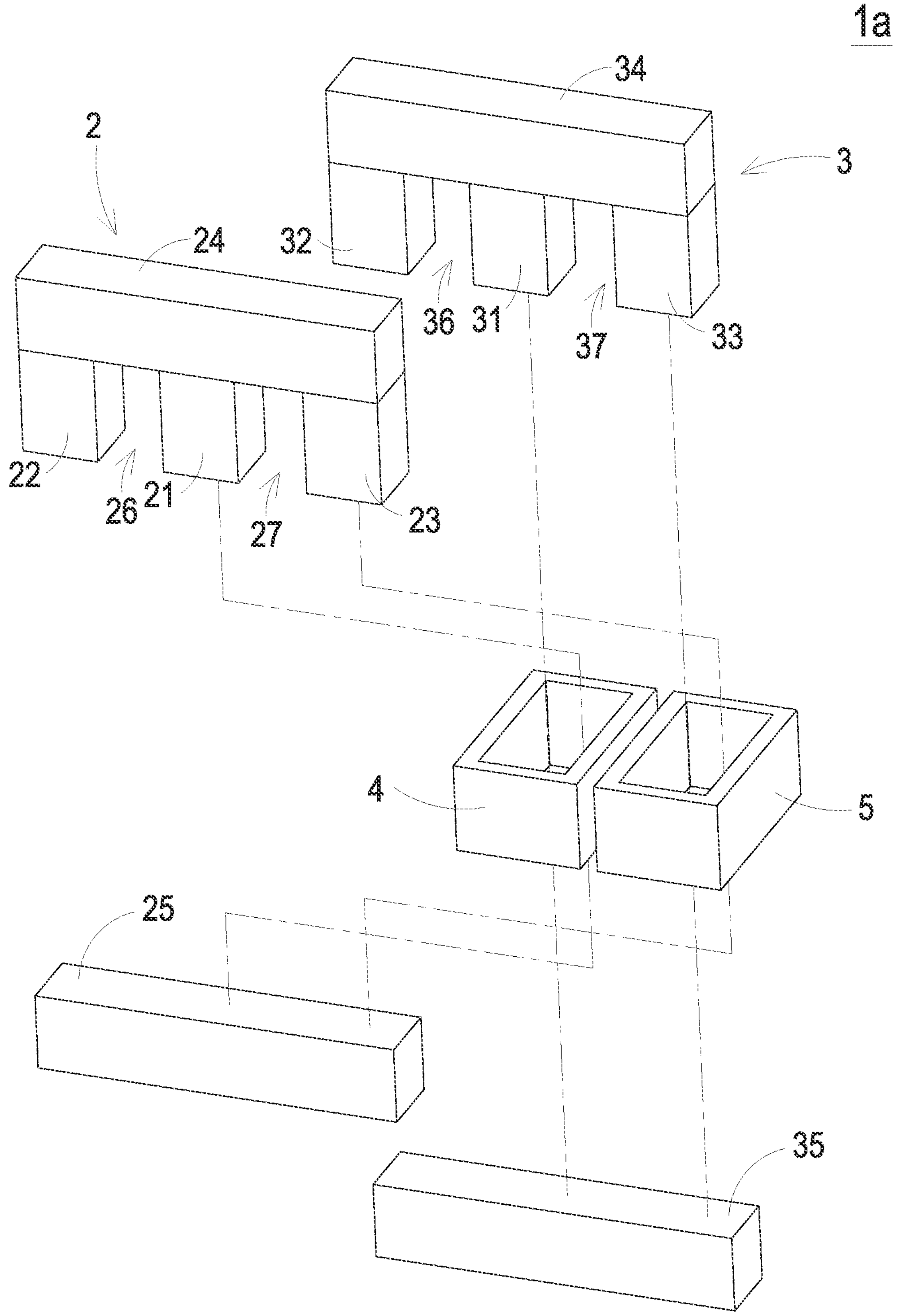
FIG. 8 is a schematic exploded view illustrating the structure of the magnetic element as shown in FIG. 7.

Please refer to FIGS. 7 and 8. FIG. 7 is a schematic perspective view illustrating the structure of a magnetic element according to a second embodiment of the present disclosure. FIG. 8 is a schematic exploded view illustrating the structure of the magnetic element as shown in FIG. 7. In this embodiment, the magnetic element 1*a* also includes a first magnetic core 2, a second magnetic core 3, a first winding 4 and a second winding 5. The structures and functions of the first magnetic core 2, the second magnetic core 3, the first winding 4 and the second winding 5 of the magnetic element 1*a* are similar to that of the first magnetic core 2, the second magnetic core 3, the first winding 4 and the second winding 5 of the magnetic element 1 as shown in FIG. 1. Component parts and elements corresponding to those of the first embodiment are designated by identical numeral references, and detailed descriptions thereof are omitted. In comparison with the first embodiment, the relationship between the first magnetic core 2 and the second magnetic core 3 of this embodiment is distinguished. In this embodiment, the second magnetic core 3 of the magnetic element 1*a* is in symmetry with the first magnetic core 2 of the magnetic element 1*a*.

The first magnetic core 2 includes a first middle core part 21, a first lateral core part 22, a second lateral core part 23, a first upper core part 24 and a first lower core part 25. The second magnetic core 3 includes a second middle core part 31, a third lateral core part 32, a fourth lateral core part 33, a second upper core part 34 and a second lower core part 35. The first middle core part 21 is located beside the second middle core part 31. Preferably, the first middle core part 21 is attached on the second middle core part 31. The first lateral core part 22 is located beside the third lateral core part 32. Preferably, the first lateral core part 22 is attached on the third lateral core part 32. The second lateral core part 23 is located beside the fourth lateral core part 33. Preferably, the second lateral core part 23 is attached on the fourth lateral core part 33.

Please refer to FIGS. 7 and 8 again. A first accommodation space 26 is defined by the first middle core part 21, the first lateral core part 22, the first upper core part 24 and the first lower core part 25 collaboratively. A second accommodation space 27 is defined by the first middle core part 21, the second lateral core part 23, the first upper core part and the first lower core part 25 collaboratively. A third accommodation space 36 is defined by the second middle core part 31, the third lateral core part 32, the second upper core part 34 and the second lower core part 35 collaboratively. A fourth accommodation space 37 is defined by the second middle core part 31, the fourth lateral core part 33, the second upper core part 34 and the second lower core part 35 collaboratively. In this embodiment, the first accommodation space 26 is located beside the third accommodation space 36, and the second accommodation space 27 is located beside the fourth accommodation space 37.

In this embodiment, a portion of the first winding 4 is accommodated within the first accommodation space 26 and the third accommodation space 36, and the other portion of the first winding 4 is accommodated within the second accommodation space 27 and the fourth accommodation space 37. Consequently, the first winding 4 is wound around the first middle core part 21 of the first magnetic core 2 and the second middle core part 31 of the second magnetic core 3. A portion of the second winding 5 is accommodated within the second accommodation space 27 and the fourth accommodation space 37. Consequently, the second winding 5 is wound around the second lateral core part 23 of the first magnetic core 2 and the fourth lateral core part 33 of the second magnetic core 3.

Please refer to FIGS. 7 and 8 again. In an embodiment, a thickness of the first air gap 7 ranges between 0.1 mm and 0.5 mm, and a thickness of the second air gap 8 ranges between 0.1 mm and 0.5 mm. In other embodiment, the thickness of the first air gap 7 formed between the first middle core part 21 and the first lower core part 25 is equal to the thickness of the second air gap 8 formed between the second middle core part 31 and the second lower core part 35. The thickness of the first air gap 7 formed between the first lateral core part 22 and the first lower core part 25 is equal to the thickness of the second air gap 8 formed between the third lateral core part 32 and the second lower core part 35. The thickness of the first air gap 7 formed between the second lateral core part 23 and the first lower core part 25 is equal to the thickness of the second air gap 8 formed between the fourth lateral core part 33 and the second lower core part 35. The thickness of the second air gap 8 formed between the third lateral core part 32 and the second lower core part 35 is equal to the thickness of the second air gap 8 formed between the fourth lateral core part 33 and the second lower core part 35. The thickness of the second air gap 8 formed between the third lateral core part 32 and the second lower core part 35 is not equal to the thickness of the second air gap 8 formed between the second middle core part 31 and the second lower core part 35.

Figure 9:
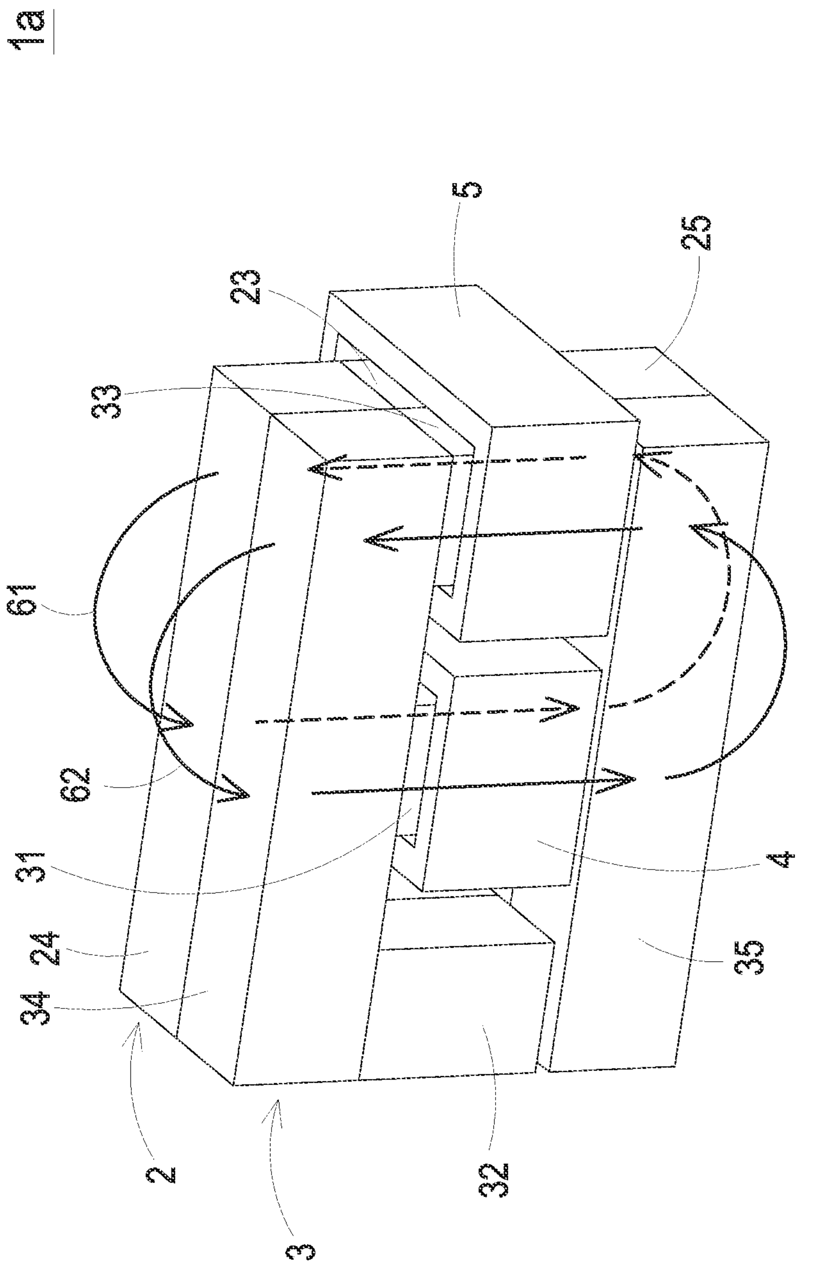
FIG. 9 schematically illustrates the operation of the magnetic element as shown in FIG. 7 and in a first mode.

FIG. 9 schematically illustrates the operation of the magnetic element as shown in FIG. 7 and in a first mode. As shown in FIG. 9, the direction of the current flowing through the first winding 4 and the direction of the current flowing through the second winding 5 are opposite. Due to the interaction between the first winding 4, the second winding 5, the first magnetic core 2 and the second magnetic core 3, the magnetic element 1*a* is operated in the first mode. The first magnetic force lines 61 generated by the first magnetic core 2 pass through the first lower core part 25, the second lateral core part 23, the first upper core part 24, the first middle core part 21 and the first lower core part 25, so that the loop of the first magnetic force lines 61 is generated. The second magnetic force lines 62 generated by the second magnetic core 3 pass through the second lower core part 35, the fourth lateral core part 33, the second upper core part 34, the second middle core part 31 and the second lower core part 35, so that the loop of the second magnetic force lines 62 is generated.

Figure 10:
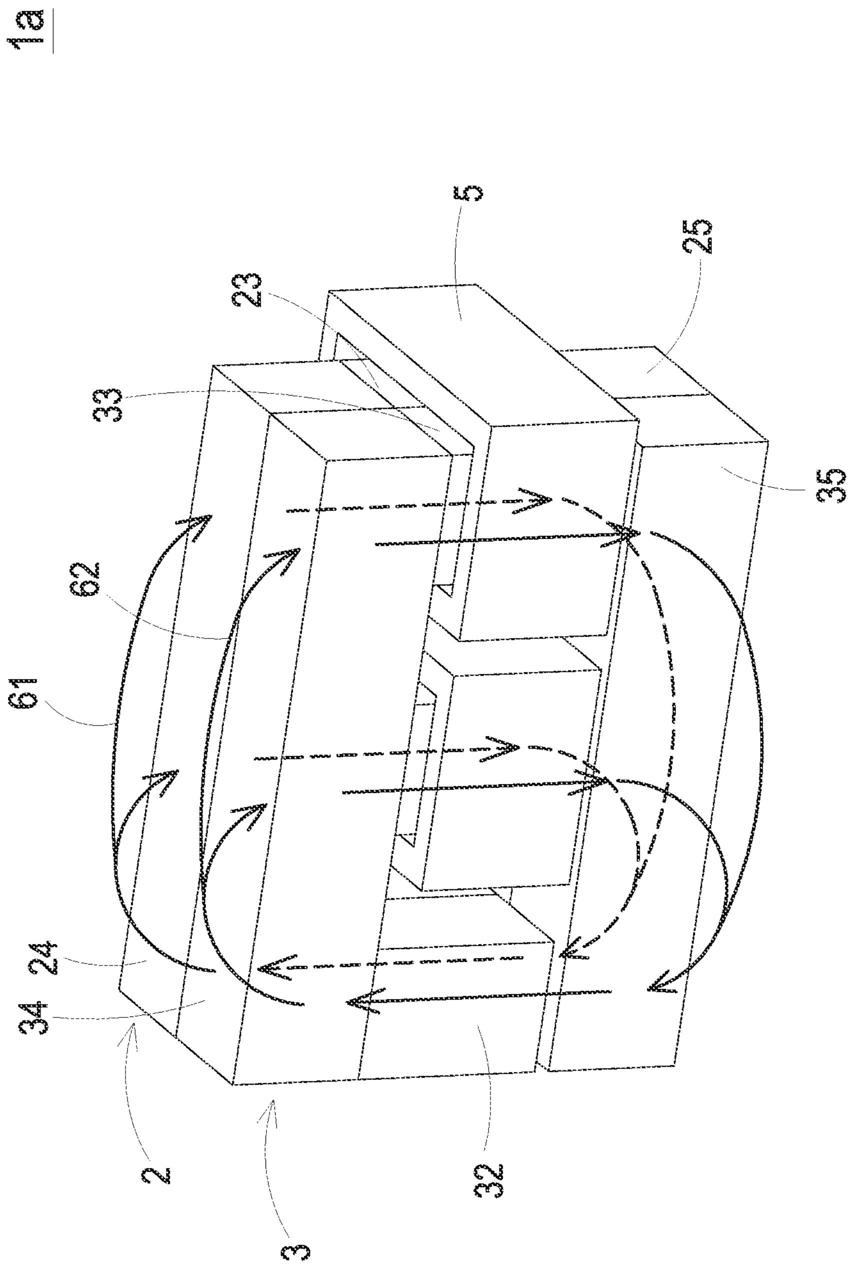
FIG. 10 schematically illustrates the operation of the magnetic element as shown in FIG. 7 and in a second mode.

FIG. 10 schematically illustrates the operation of the magnetic element as shown in FIG. 7 and in a second mode. As shown in FIG. 10, the direction of the current flowing through the first winding 4 and the direction of the current flowing through the second winding 5 are identical. Due to the interaction between the first winding 4, the second winding 5, the first magnetic core 2 and the second magnetic core 3, the magnetic element 1*a* is operated in the second mode.

The first magnetic force lines 61 generated by the first magnetic core 2 travel along two loops. The first magnetic force lines 61 pass through the first lower core part 25, the first lateral core part 22, the first upper core part 24, the first middle core part 21 and the first lower core part 25 to form the first loop. The first magnetic force lines 61 pass through the first lower core part 25, the first lateral core part 22, the first upper core part 24, the second lateral core part 23 and the first lower core part 25 to form the second loop.

The second magnetic force lines 62 generated by the second magnetic core 3 travel along two loops. The second magnetic force lines 62 pass through the second lower core part 35, the third lateral core part 32, the second upper core part 34, the second middle core part 31 and the second lower core part 35 to form the first loop. The second magnetic force lines 62 pass through the second lower core part 35, the third lateral core part 32, the second upper core part 34, the fourth lateral core part 33 and the second lower core part 35 to form the second loop.

Figure 11:
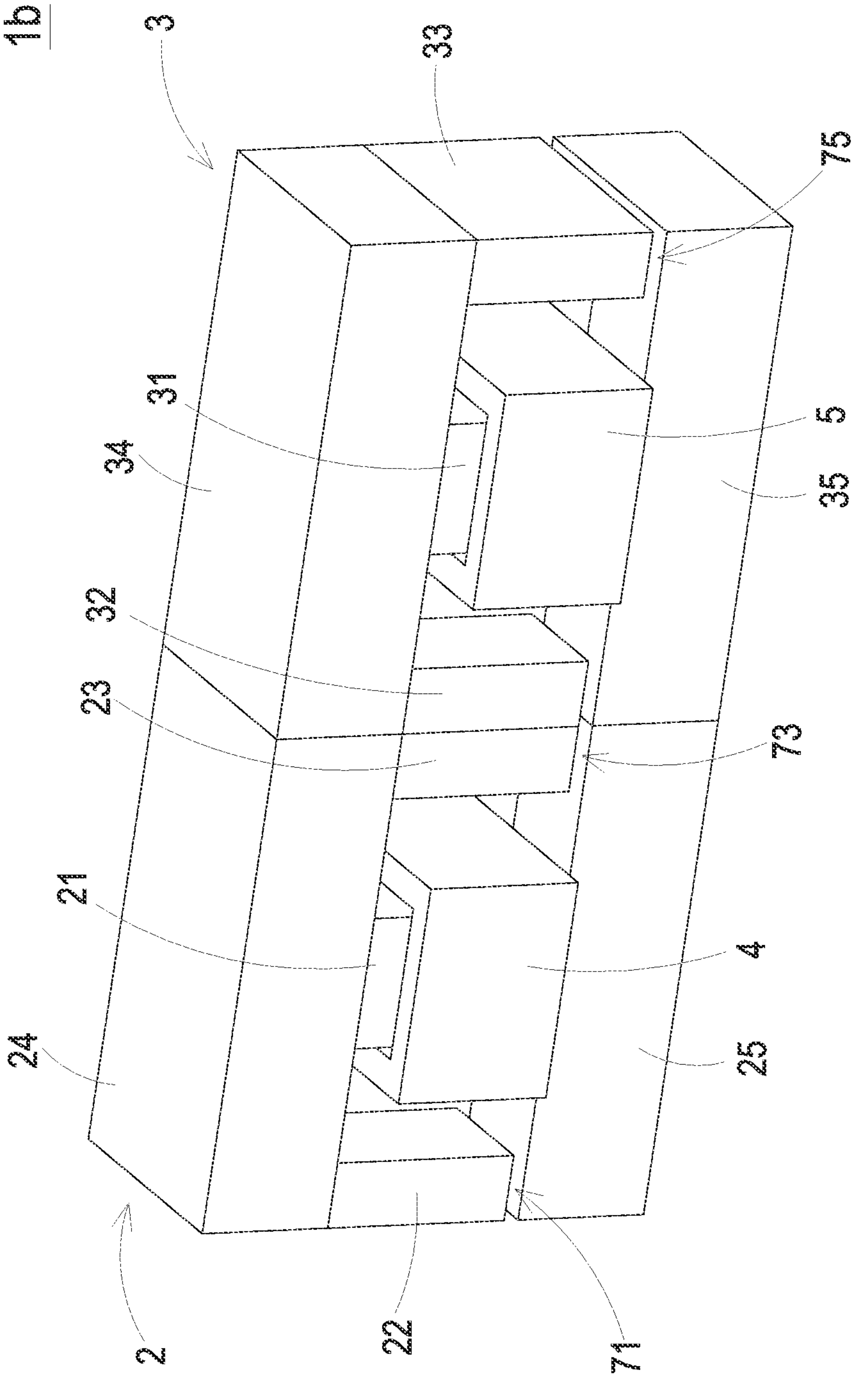
FIG. 11 is a schematic perspective view illustrating the structure of a magnetic element according to a third embodiment of the present disclosure.
Figure 12:
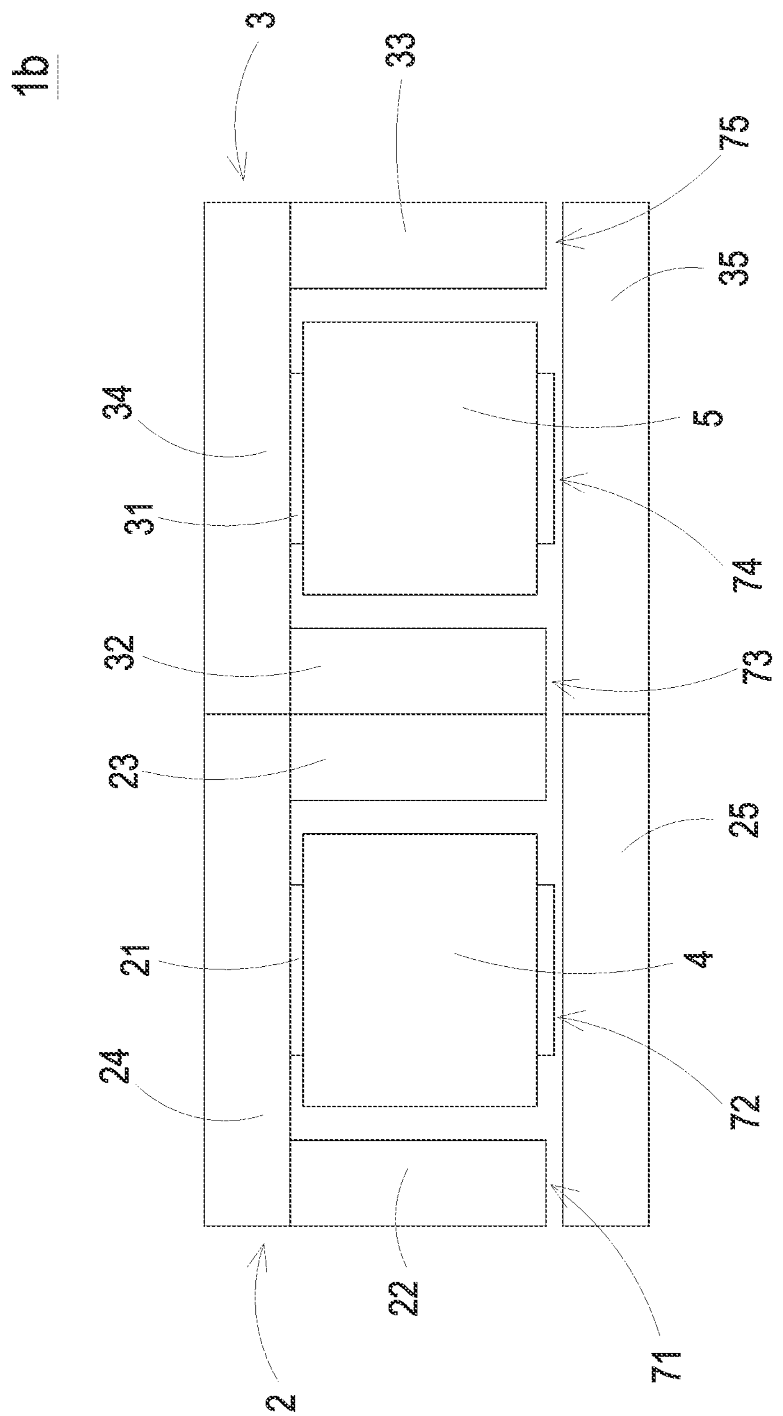
FIG. 12 is a schematic side view illustrating the structure of the magnetic element as shown in FIG. 11 and taken along another viewpoint.

Please refer to FIGS. 11 and 12. FIG. 11 is a schematic perspective view illustrating the structure of a magnetic element according to a third embodiment of the present disclosure. FIG. 12 is a schematic side view illustrating the structure of the magnetic element as shown in FIG. 11 and taken along another viewpoint. In this embodiment, the magnetic element 1*b* also includes a first magnetic core 2, a second magnetic core 3, a first winding 4 and a second winding 5. The structures and functions of the first magnetic core 2, the second magnetic core 3, the first winding 4 and the second winding 5 of the magnetic element 1*b* are similar to that of the first magnetic core 2, the second magnetic core 3, the first winding 4 and the second winding 5 of the magnetic element 1 as shown in FIG. 1. Component parts and elements corresponding to those of the first embodiment are designated by identical numeral references, and detailed descriptions thereof are omitted. In comparison with the first embodiment, the relationship between the first magnetic core 2 and the second magnetic core 3 of this embodiment is distinguished. In this embodiment, the second magnetic core 3 is coplanar with the first magnetic core 2.

The first magnetic core 2 includes a first middle core part 21, a first lateral core part 22, a second lateral core part 23, a first upper core part 24 and a first lower core part 25. The second magnetic core 3 includes a second middle core part 31, a third lateral core part 32, a fourth lateral core part 33, a second upper core part 34 and a second lower core part 35. In this embodiment, the first lateral core part 22, the first middle core part 21, the second lateral core part 23, the third lateral core part 32, the second middle core part 31 and the fourth lateral core part 33 are sequentially disposed along a linear direction. The first upper core part 24 and the second upper core part 34 are attached on each other to form a combined upper core part. The first lower core part 25 and the second lower core part 35 are attached on each other to form a combined lower core part. The second lateral core part 23 and the third lateral core part 32 are attached on each other to form a combined lateral core part.

Figure 13:
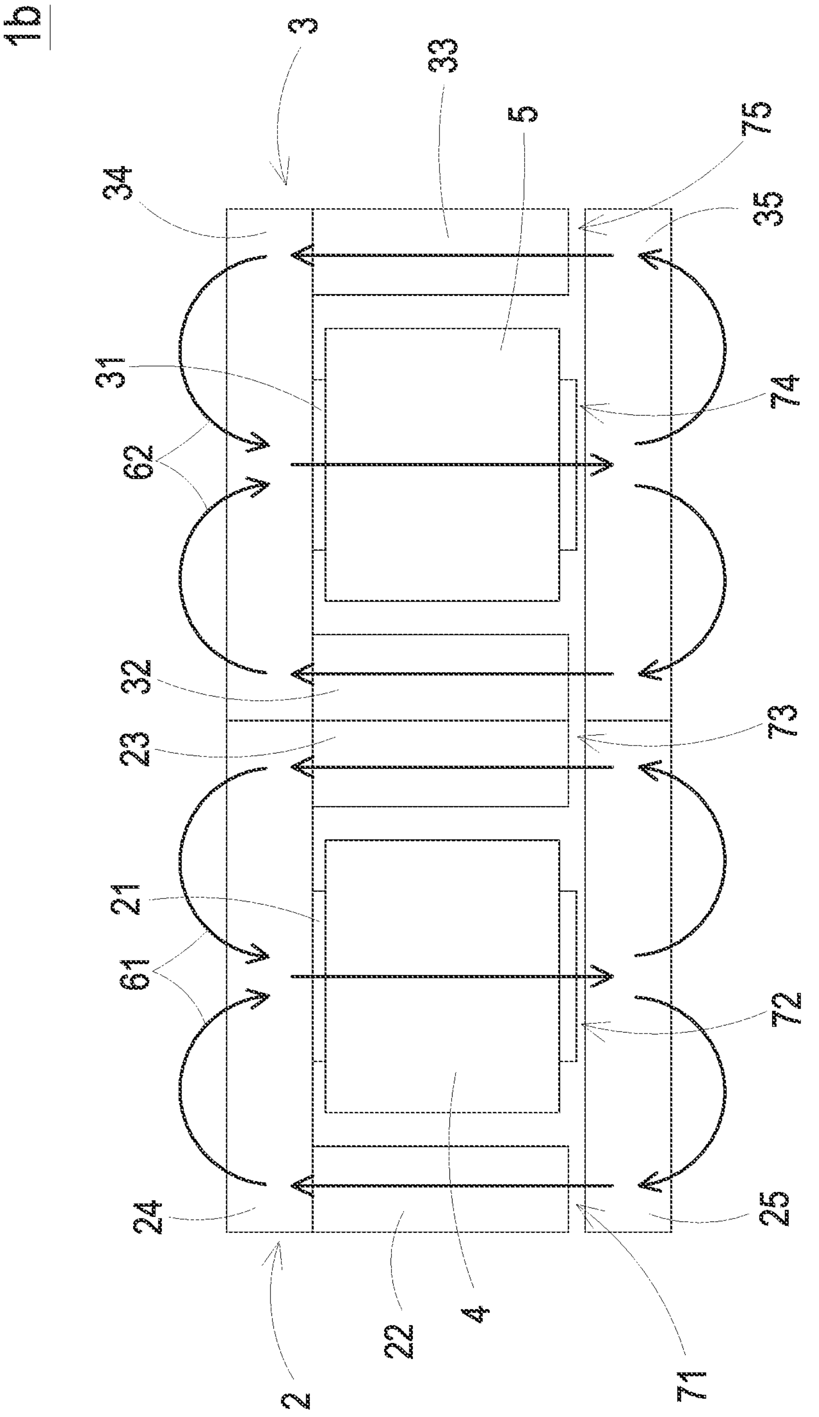
FIG. 13 schematically illustrates the operation of the magnetic element as shown in FIG. 11 and in a first mode.

FIG. 13 schematically illustrates the operation of the magnetic element as shown in FIG. 11 and in a first mode. As shown in FIG. 13, the direction of the current flowing through the first winding 4 and the direction of the current flowing through the second winding 5 are identical. Due to the interaction between the first winding 4, the second winding 5, the first magnetic core 2 and the second magnetic core 3, the magnetic element 1*b* is operated in the first mode.

The first magnetic force lines 61 generated by the first magnetic core 2 travel along two loops. The first magnetic force lines 61 pass through the first lower core part 25, the first lateral core part 22, the first upper core part 24, the first middle core part 21 and the first lower core part 25 to form the first loop. The first magnetic force lines 61 pass through the first lower core part 25, the combined lateral core part (23, 32), the first upper core part 24, the first middle core part 21 and the first lower core part 25 to form the second loop.

The second magnetic force lines 62 generated by the second magnetic core 3 travel along two loops. The second magnetic force lines 62 pass through the second lower core part 35, the combined lateral core part (23, 32), the second upper core part 34, the second middle core part 31 and the second lower core part 35 to form the first loop. The second magnetic force lines 62 pass through the second lower core part 35, the fourth lateral core part 33, the second upper core part 34, the second middle core part 31 and the second lower core part 35 to form the second loop.

Figure 14:
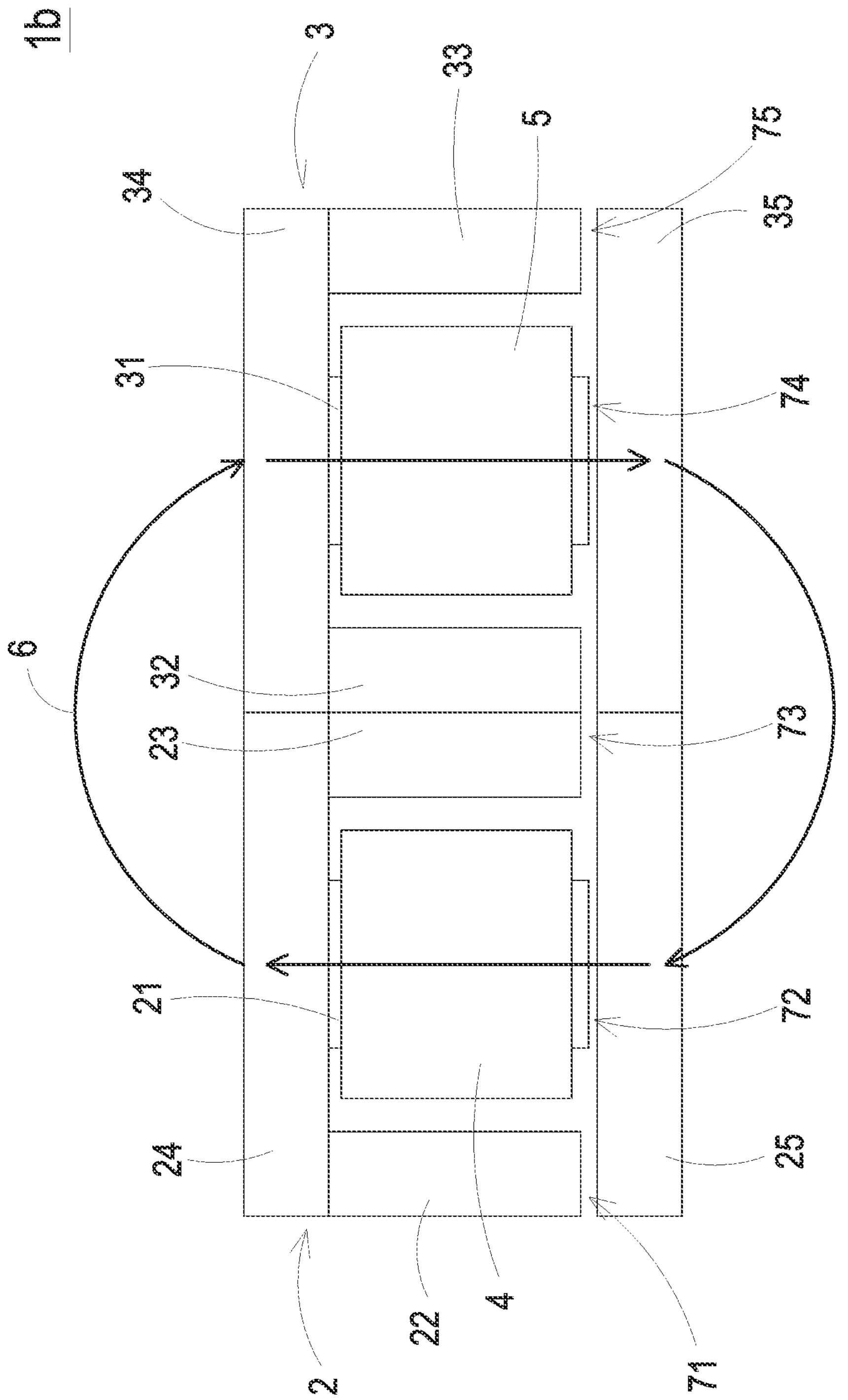
FIG. 14 schematically illustrates the operation of the magnetic element as shown in FIG. 11 and in a second mode.

FIG. 14 schematically illustrates the operation of the magnetic element as shown in FIG. 11 and in a second mode. As shown in FIG. 14, the direction of the current flowing through the first winding 4 and the direction of the current flowing through the second winding 5 are opposite. Due to the interaction between the first winding 4, the second winding 5, the first magnetic core 2 and the second magnetic core 3, the magnetic element 1*b* is operated in the second mode.

The first magnetic force lines 61 generated by the first magnetic core 2 and the second magnetic force lines 62 generated by the second magnetic core 3 are combined as resultant magnetic force lines 6. The resultant magnetic force lines 6 pass through the combined lower core part (25, 35), the first middle core part 21, the combined upper core part (24, 34), the second middle core part 31 and the combined lower core part (25, 35). Consequently, the loop of the resultant magnetic force lines 6 is formed.

Please refer to FIG. 12 again. A first air gap 71 is formed between the first lateral core part 22 and the combined lower core part (25, 35). A second air gap 72 is formed between the first middle core part 21 and the combined lower core part (25, 35). A third air gap 73 is formed between the combined lateral core part (23, 32) and the combined lower core part (25, 35). A fourth air gap 74 is formed between the second middle core part 31 and the combined lower core part (25, 35). A fifth air gap 75 is formed between the fourth lateral core part 33 and the combined lower core part (25, 35). In this embodiment, the second air gap 72 is smaller than the first air gap 71 and the third air gap 73, and the fourth air gap 74 is smaller than the third air gap 73 and the fifth air gap 75. As shown in FIGS. 13 and 14, the second air gap 72 and the fourth air gap 74 are in the loop of the magnetic force lines in the second mode of the magnetic element 1*b*, and the first air gap 71, the second air gap 72, the third air gap 73, the fourth air gap 74 and the fifth air gap 75 are in the loop of the magnetic force lines in the first mode of the magnetic element 1*b*. That is, regardless of whether the magnetic element 1*b* is in the first mode or the second mode, the second air gap 72 and the fourth air gap 74 are in the loop of the magnetic force lines. Since the second air gap 72 is smaller than the first air gap 71 and the third air gap 73 and the fourth air gap 74 is smaller than the third air gap 73 and the fifth air gap 75, the inductance of the magnetic element 1*b* in the second mode is enhanced.

Figure 15:
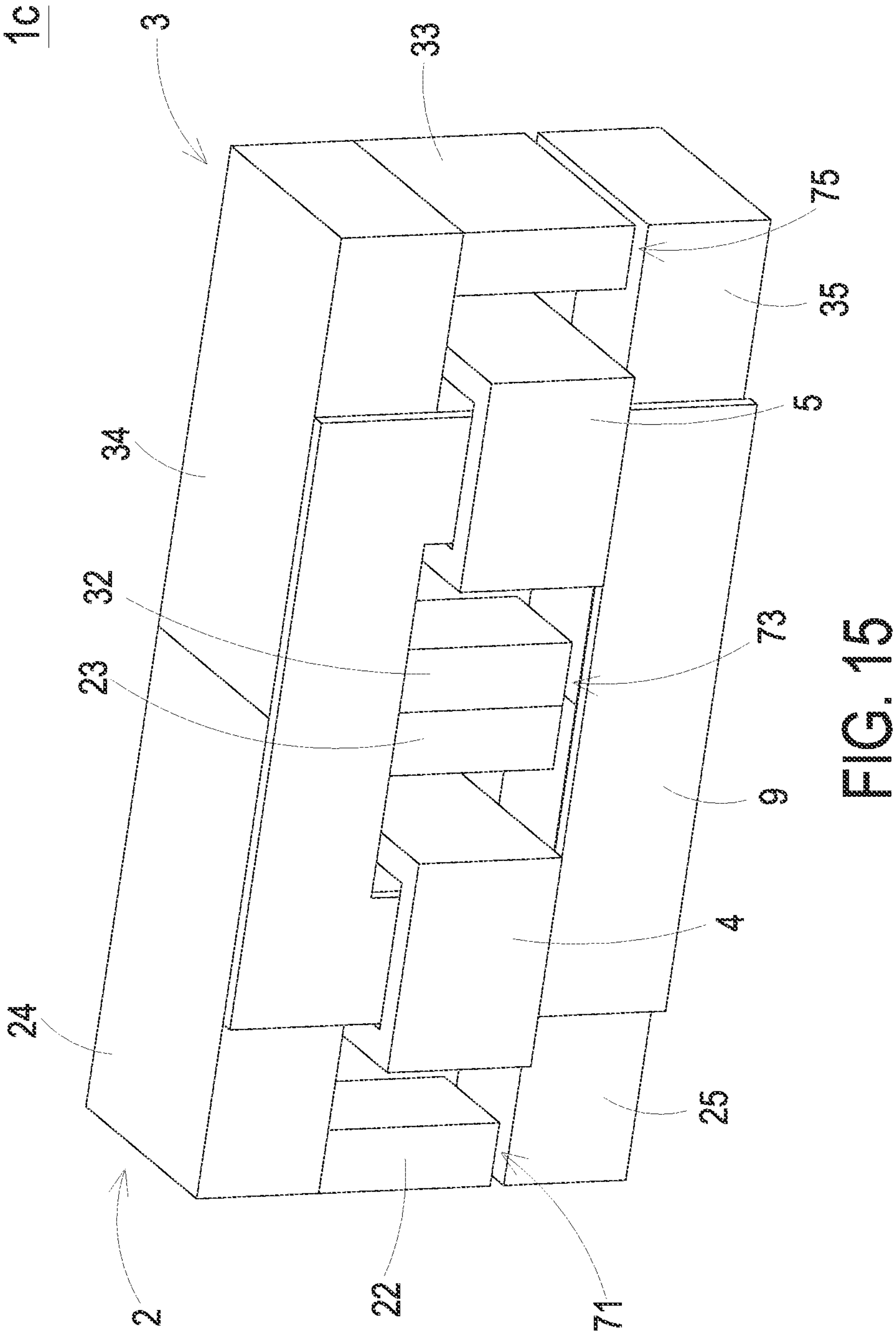
FIG. 15 is a schematic perspective view illustrating the structure of a magnetic element according to a fourth embodiment of the present disclosure.
Figure 16:
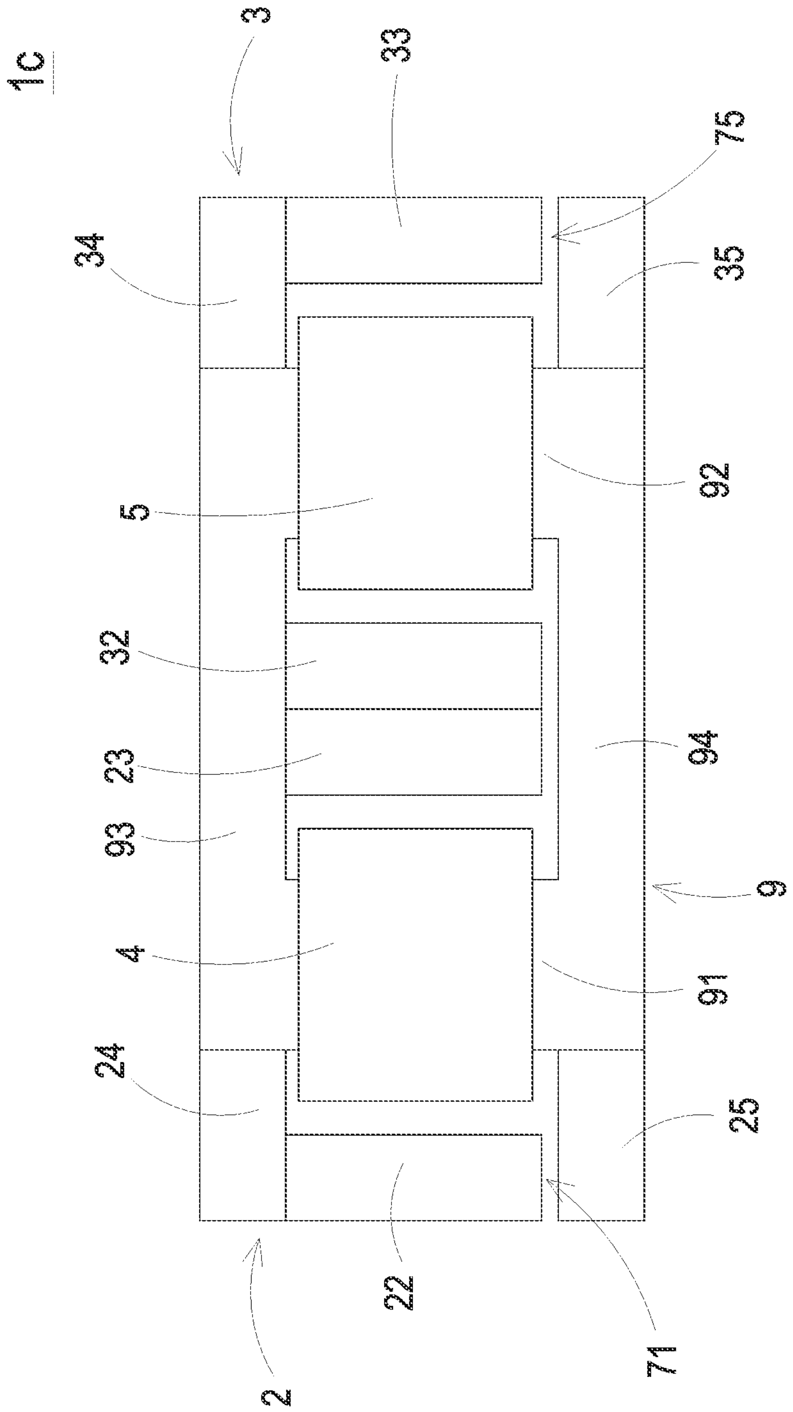
FIG. 16 is a schematic side view illustrating the structure of the magnetic element as shown in FIG. 15 and taken along another viewpoint.

Please refer to FIGS. 15 and 16. FIG. 15 is a schematic perspective view illustrating the structure of a magnetic element according to a fourth embodiment of the present disclosure. FIG. 16 is a schematic side view illustrating the structure of the magnetic element as shown in FIG. 15 and taken along another viewpoint. In this embodiment, the magnetic element 1*c* also includes a first magnetic core 2, a second magnetic core 3, a first winding 4 and a second winding 5. The structures and functions of the first magnetic core 2, the second magnetic core 3, the first winding 4 and the second winding 5 of the magnetic element 1*c* are similar to that of the first magnetic core 2, the second magnetic core 3, the first winding 4 and the second winding 5 of the magnetic element 1*b* as shown in FIG. 11. Component parts and elements corresponding to those of the first embodiment are designated by identical numeral references, and detailed descriptions thereof are omitted.

In comparison with the magnetic element 1*b* of the third embodiment, the magnetic element 1*c* of this embodiment further includes a silicon steel plate 9. The silicon steel plate 9 includes a first wound part 91, a second wound part 92, a first connection part 93 and a second connection part 94.

The first wound part 91 and the second wound part 92 are opposed to each other. The first wound part 91 is aligned with the first middle core part 21. Preferably, the first wound part 91 is attached on the first middle core part 21, and a portion of the first wound part 91 is located beside the second air gap 72. The second wound part 92 is aligned with the second middle core part 31. Preferably, the second wound part 92 is attached on the second middle core part 31, and a portion of the second wound part 92 is located beside the fourth air gap 74. The first connection part 93 and the second connection part 94 are opposed to each other. The two ends of the first connection part 93 are connected with a first end of the first wound part 91 and a first end of the second wound part 92, respectively. The first connection part 93 is aligned with a portion of the first upper core part 24 and a portion of the second upper core part 34. The two ends of the second connection part 94 are connected with a second end of the first wound part 91 and a second end of the second wound part 92, respectively. The second connection part 94 is aligned with a portion of the first lower core part 25 and a portion of the second lower core part 35.

The first winding 4 is wound around the first middle core part 21 and the first wound part 91 of the silicon steel plate 9. The second winding 5 is wound around the second middle core part 31 and the second wound part 92 of the silicon steel plate 9. As mentioned above, the second air gap 72 and the fourth air gap 74 are in the loop of the magnetic force lines in the second mode of the magnetic element 1*c*. Since the first wound part 91 and the second wound part 92 of the silicon steel plate 9 are respectively located beside the second air gap 72 and the fourth air gap 74, the first wound part 91 and the second wound part 92 of the silicon steel plate 9 additionally provide the loop of the magnetic force lines in the second mode. Consequently, the inductance of the magnetic element 1*c* in the second mode is enhanced.

From the above descriptions, the present disclosure provides the first magnetic core, the second magnetic core, the first winding and the second winding. In some embodiments, the first winding is wound around the first magnetic core and the second magnetic core, and the second winding is wound around the first magnetic core and the second magnetic core. In some other embodiments, the first magnetic core and the second magnetic core are attached on each other, and the first winding and the second winding are respectively wound around the first magnetic core and the second magnetic core. Due to the structural design, the magnetic element is operated in a first mode and a second mode. According to the directions of the currents flowing through the two windings, the magnetic element of the present disclosure is operated in two modes to be configured as the differential mode inductor and the common mode inductor. Compared with the conventional magnetic element with single magnetic core or two magnetic cores, the magnetic element of the present disclosure has functions of the differential mode inductor and the common mode inductor, and the common mode inductance is increased. Consequently, the magnetic element of the present disclosure is effectively capable of suppressing electromagnetic interference.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A magnetic element, comprising:

a first magnetic core comprising a first upper core part, a first lower core part, a first middle core part, a first lateral core part and a second lateral core part, wherein the first upper core part and the first lower core part are opposed to each other, and the first middle core part, the first lateral core part and the second lateral core part are disposed between the first upper core part and the first lower core part;

a first winding wound around the first middle core part;

a second magnetic core being coplanar with the first magnetic core and comprising a second upper core part, a second lower core part, a second middle core part, a third lateral core part and a fourth lateral core part, wherein the second upper core part and the second lower core part are opposed to each other, and the second middle core part, the third lateral core part and the fourth lateral core part are disposed between the second upper core part and the second lower core part, wherein the first lower core part and the second lower core part are attached on each other to form a combined lower core part, and the second lateral core part and the third lateral core part are attached on each other to form a combined lateral core part; and a second winding wound around the second middle core part, wherein a first air gap is formed between the first lateral core part and the combined lower core part, a second air gap is formed between the first middle core part and the combined lower core part, a third air gap is formed between the combined lateral core part and the combined lower core part, a fourth air gap is formed between the second middle core part and the combined lower core part, and a fifth air gap is formed between the fourth lateral core part and the combined lower core part, wherein the second air gap is smaller than the first air gap and the third air gap, and the fourth air gap is smaller than the third air gap and the fifth air gap.

2. The magnetic element according to claim 1, wherein the magnetic element further comprises a silicon steel plate, and the silicon steel plate comprises a first wound part, a second wound part, a first connection part and a second connection part, wherein the first wound part and the second wound part are opposed to each other, and the first connection part and the second connection part are opposed to each other, wherein two ends of the first connection part are respectively connected with a first end of the first wound part and a first end of the second wound part, and two ends of the second connection part are respectively connected with a second end of the first wound part and a second end of the second wound part, wherein the first wound part is aligned with the first middle core part, the second wound part is aligned with the second middle core part, the first connection part is aligned with a portion of the first upper core part and a portion of the second upper core part, and the second connection part is aligned with a portion of the first lower core part and a portion of the second lower core part.

3. The magnetic element according to claim 2, wherein the first winding is wound around the first middle core part and the first wound part, and the second winding is wound around the second middle core part and the second wound part.

* * * * *